United States Patent
Manotas Gutiérrez et al.

(10) Patent No.: US 12,361,932 B2
(45) Date of Patent: Jul. 15, 2025

(54) PERSONALITY-ENHANCED CHAT DISCOURSE RESPONSES

(71) Applicant: INTERNATIONAL BUSINESS MACHINES CORPORATION, Armonk, NY (US)

(72) Inventors: Irene Lizeth Manotas Gutiérrez, White Plains, NY (US); Ra'eesa Kabir, Birmingham (GB); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 18/333,573

(22) Filed: Jun. 13, 2023

(65) Prior Publication Data
US 2024/0420688 A1    Dec. 19, 2024

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01)

(58) Field of Classification Search
CPC ..... G10L 15/1815; G10L 15/22; G06F 40/30; G06F 40/35; G06F 40/56; G06N 3/006; H04L 51/02
See application file for complete search history.

(56) References Cited

U.S. PATENT DOCUMENTS

| | | | |
|---|---|---|---|
| 6,731,307 B1 | 5/2004 | Strubbe | |
| 11,010,700 B2 * | 5/2021 | Keen | G06Q 10/063114 |
| 2007/0271098 A1 * | 11/2007 | Stewart | G10L 17/26 |
| | | | 704/E17.002 |
| 2015/0099257 A1 | 4/2015 | Kozloski | |
| 2016/0119377 A1 | 4/2016 | Goldberg | |
| 2016/0133274 A1 * | 5/2016 | Conway | H04M 3/2281 |
| | | | 704/257 |
| 2017/0228520 A1 | 8/2017 | Kidd | |
| 2019/0065627 A1 | 2/2019 | De Mel | |
| 2019/0205382 A1 * | 7/2019 | Raux | G06F 40/30 |

(Continued)

OTHER PUBLICATIONS

Fernau, et al., "Towards Personality-Aware Chatbots," Proceedings of the 23rd Annual Meeting of the Special Interest Group on Discourse and Dialogue, Sep. 2022, pp. 135-145, Association for Computational Linguistics, Edinburgh, UK, Retrieved from the Internet: <URL: <https://aclanthology.org/2022.sigdial-1.15/>.

(Continued)

*Primary Examiner* — Abul K Azad
(74) *Attorney, Agent, or Firm* — Robert D. Bean (57) ABSTRACT

According to one embodiment, a method, computer system, and computer program product for human-machine interfacing is provided. The present invention may include receiving a personality corpus associated with a personality typology comprising multiple personality types; extracting a plurality of utterances from a user; selecting, by a personality model, a personality type associated with the user based on the utterances and the personality corpus; identifying a compatible personality type of the selected personality type; constructing one or more natural language scripts from a word graph associated with the compatible personality type; and transmitting the one or more natural language scripts to the user.

25 Claims, 4 Drawing Sheets

(56) References Cited

U.S. PATENT DOCUMENTS

| | | | |
|---|---|---|---|
| 2020/0114207 | A1 | 4/2020 | Weldemariam |
| 2020/0320172 | A1 | 10/2020 | Kalia |
| 2021/0064827 | A1 | 3/2021 | Galitsky |
| 2022/0360547 | A1 | 11/2022 | Hodge |
| 2023/0055597 | A1* | 2/2023 | Niiro .................. G06Q 30/0282 |
| 2023/0334249 | A1* | 10/2023 | Kumar .................. G06N 5/022 |
| 2024/0054118 | A1* | 2/2024 | Emma .................... G06N 3/006 |

OTHER PUBLICATIONS

Jassova, "Developing Chatbot Personality: How to Guide 2021," Landbot [online], Jun. 3, 2021 [accessed on Mar. 17, 2023], 20 pages, Retrieved from the Internet: <URL: https://landbot.io/blog/chatbot-personality>.

MBTI Online, "A new perspective on you," mbti [online], [accessed on Mar. 21, 2023], 4 pages, Retrieved from the Internet: <URL: https://www.mbtionline.com/en-US>.

The Myers & Briggs Foundation, Datasheet [online], [accessed on Mar. 17, 2023], 3 pages, Retrieved from the Internet: <URL: https://www.myersbriggs.org/#>.

Wen, et al., "Automatically Select Emotion for Response via Personality-affected Emotion Transition," Findings of the Association for Computational Linguistics: ACL-IJCNLP 2021, Aug. 2021, pp. 5010-5020, Association for Computational Linguistics, DOI: 10.18653/v1/2021.findings-acl.444, Retrieved from the Internet: < URL: https://aclanthology.org/2021.findings-acl.444/>.

* cited by examiner

PERSONALITY-ENHANCED CHAT DISCOURSE RESPONSES

BACKGROUND

The present invention relates, generally, to the field of computing, and more particularly to conversational agents.

The field of conversational agents, or dialogue systems, may be concerned with the development of computer systems designed to converse with a living human. Dialogue systems may use one or more of text, speech, graphics, haptics, gestures, and other modes of communication on both the input and output channel. As computing devices become ubiquitous in our everyday lives, the interface between humans and computing devices is no longer relevant only to the dedicated subset of the populace that works with computers, but to society at large. Facilitating casual interactions between man and machine therefore stands to yield great cumulative advantages in the speed and efficiency with which individuals' interface with the many computing devices in their everyday lives.

SUMMARY

According to one embodiment, a method, computer system, and computer program product for human-machine interfacing is provided. The present invention may include receiving a personality corpus associated with a personality typology comprising multiple personality types; extracting a plurality of utterances from a user; selecting, by a personality model, a personality type associated with the user based on the utterances and the personality corpus; identifying a compatible personality type of the selected personality type; constructing one or more natural language scripts from a word graph associated with the compatible personality type; and transmitting the one or more natural language scripts to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to conversational agents. The following described exemplary embodiments provide a system, method, and program product to, among other things, identify a personality associated with a human user based on extracting personality information from conversation with the user, and modify chat content based on the identified personality.

As previously described, the field pertaining to conversational agents, or dialogue systems, may be concerned with the development of computer systems designed to converse with a living human. Conversational agents may be computer algorithms that use one or more of text, speech, graphics, haptics, gestures, and other modes of communication on both the input and output channel. Conversational agents may fall into two broad categories. The first is task-oriented conversational agents, which employ natural language interaction with users with the objective of completing tasks, such as giving directions, providing information, controlling electronic devices, et cetera. The second category is chatbots, which are conversational agents designed to mimic the informal unstructured conversations characteristic of interactions between humans. Chatbot architectures, in turn, fall into two main classes: rule-based systems and corpus-based systems. Rule-based systems rely on a number of pre-provided rules to navigate a conversation. Corpus-based systems either retrieve responses appropriate to the context from a corpus of natural language or utilize a language model trained on a corpus of natural language. Chatbots still face significant operational challenges; currently, existing chatbots are often stilted and unnatural in conversation with human users, confined to scripted or trained responses which cannot adapt to the user. One aspect of this failing lies in the fact that humans, in natural conversation, pick up on the respective personalities of each participant in the conversation, and adjust their own conversational contributions based on the personality of the participant whom they are addressing. Chatbots have been, generally speaking, heretofore incapable of such empathy.

However, in recent years, attempts have been made in the art to endow chatbots with the ability to assess the personality of a user and react accordingly. However, such attempts often assess user personality by requiring the user to complete surveys or questionnaires, submit personality information, and/or answer questions, rather than ambiently inferring personality from user dialogue. Other offerings require a user to make a manual selection of a chatbot personality. These attempted solutions inflict tasks on a user that must be performed before conversation can continue and/or before personalization can occur and disrupts the natural flow of conversation. Other offerings in the art define personality with respect to emotions, with personality serving to modify emotions and transitions between emotions according to the Big 5 (OCEAN) personality dimensions. However, such an analysis is typically limited to a single personality typology and uses the identified personality type to modify chat content, rather than a compatible personality type, thereby risking discord where two individuals of a single personality type are not compatible.

As such, it may be advantageous to, among other things, implement a system that analyzes the speech of a user to extract a broad range of data such as term frequencies, collocations and the colligations of words, et cetera, and may then infer personality information from the extracted data through various analyses such as sentiment classification, emotion classification, tone classification, and infer concepts and categories; such a system might use the personality information to identify a personality of a user, and may then generate responses to the user drawn from a personality type that is compatible with that of the user. Therefore, the present embodiment has the capacity to improve the technical field of conversational agents by automatically inferring personality of a user based on a range of details, which results in a more accurate and comprehensive personality assessment, and enables a detailed tailoring of conversation between a chatbot and a user to the user's personality by fashioning responses to user utterances by drawing from word graphs associated with compatible personality types, which in turn results in increased harmony, realism, immersion, accuracy, and fidelity in communication, while reducing frustration. In other words, the system has the capacity to improve the technical field of conversational agents by equipping such agents with the ability to approximate human empathy in conversation, thereby improving the natural language interface between humans and computing devices.

According to one embodiment, the invention is a system for analyzing natural language utterances of a user using natural language parsing methods, deriving a chat personality model based on the analysis, generating a corpus of text that is styled to the chat recipient, and generalizing the generated corpora of text across multiple personalities and domains.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to identify a personality associated with a human user based on extracting personality information from conversation with the user, and modify chat content based on the identified personality.

Figure 1:
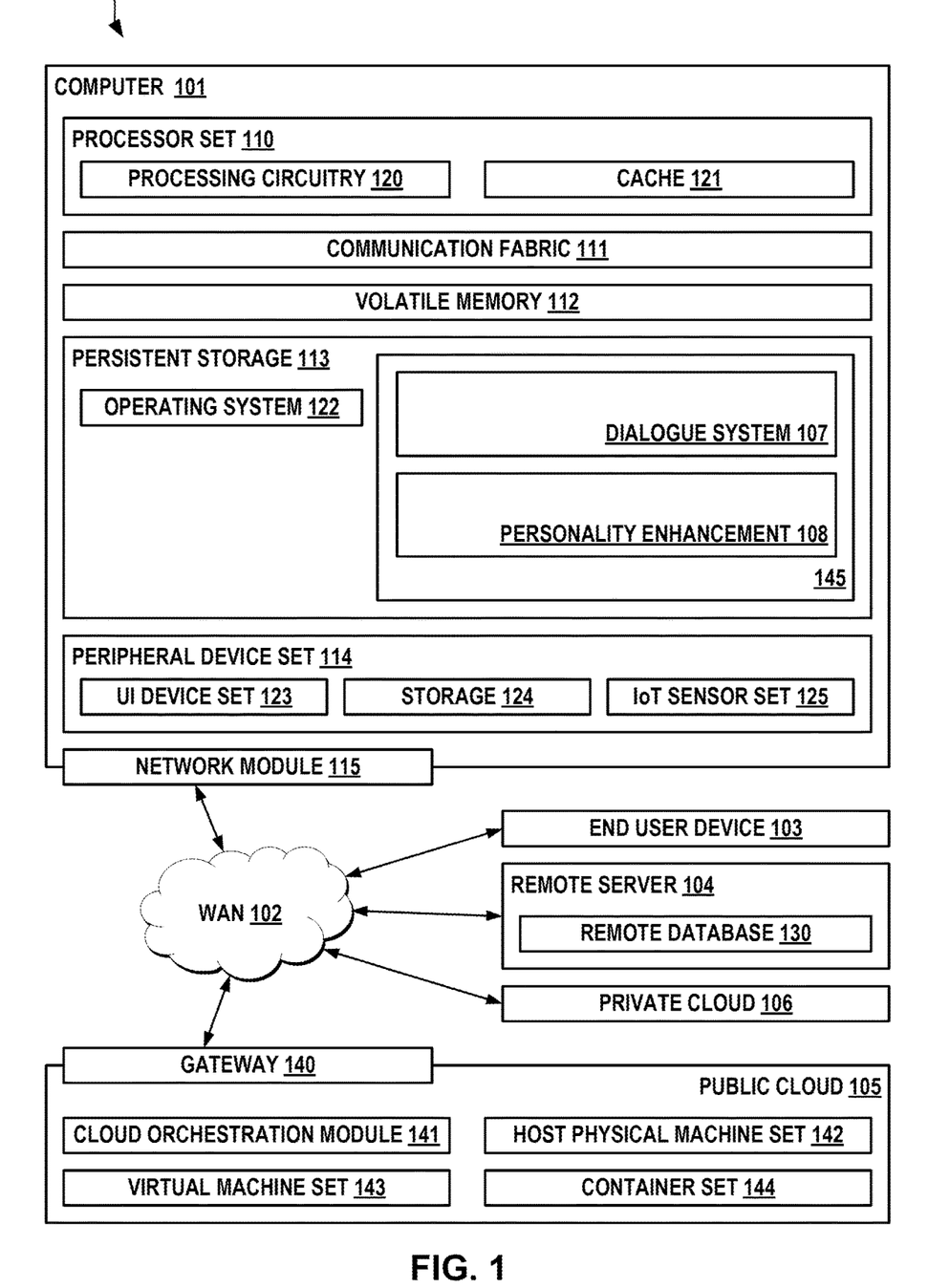
FIG. 1 illustrates an exemplary networked computer environment according to at least one embodiment.

Referring now to FIG. 1, computing environment 100 contains an example of an environment for the execution of at least some of the computer code involved in performing the inventive methods, such as code block 145, which may comprise dialogue system 107 and personality enhancement program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the dialogue system 107 may be a software program capable of conversing with a human user through text, speech, graphics, haptics, gestures, and/or other modes of communication on both the input and output channel. Dialogue system 107 may comprise a set of components that perform several key functions. Responsibility for performing these key functions may be divided up among the logical components of the software differently in different dialogue systems 107, but these functionalities may include input recognition, natural language understanding, dialogue management, task management, output generation, and output rendering. Input recognition is responsible for converting communications from a user into plain text. Natural language understanding is responsible for analyzing the plain text and extracting the text's semantic meaning. Dialogue management keeps the history and state of the dialogue and manages the general flow of the conversation based on the semantic meaning. Task management is responsible for executing tasks within a specific task domain. Output generation creates output in the form of a message to be communicated to the user. Lastly, output rendering is concerned with utilizing available hardware to render the created message in the real world and communicate the message to the user. In embodiments of the invention, dialogue system 107 may interoperate with and/or comprise personality enhancement program 108. In embodiments of the invention, the dialogue system 107 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, dialogue system 107 may be distributed in its operation over any number or combination of the aforementioned devices.

According to the present embodiment, the personality enhancement program 108 may be a program enabled to identify a personality associated with a human user based on extracting personality information from conversation with the user, and modify chat content based on the identified personality. The personality enhancement program 108 may, when executed, cause the computing environment 100 to carry out a personality enhancement process 200. The personality enhancement process 200 may be explained in further detail below with respect to FIG. 2. In embodiments of the invention, the personality enhancement program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, personality enhancement program 108 may be distributed in its operation over any number or combination of the aforementioned devices. In embodiments of the invention, personality enhancement program 108 may be a component, subroutine, functionality, et cetera of dialogue system 107, and/or may otherwise interoperate with and/or be in communication with dialogue system 107. In embodiments of the invention, personality enhancement program 108 may be a standalone program or service independent of dialogue system 107.

Figure 2:
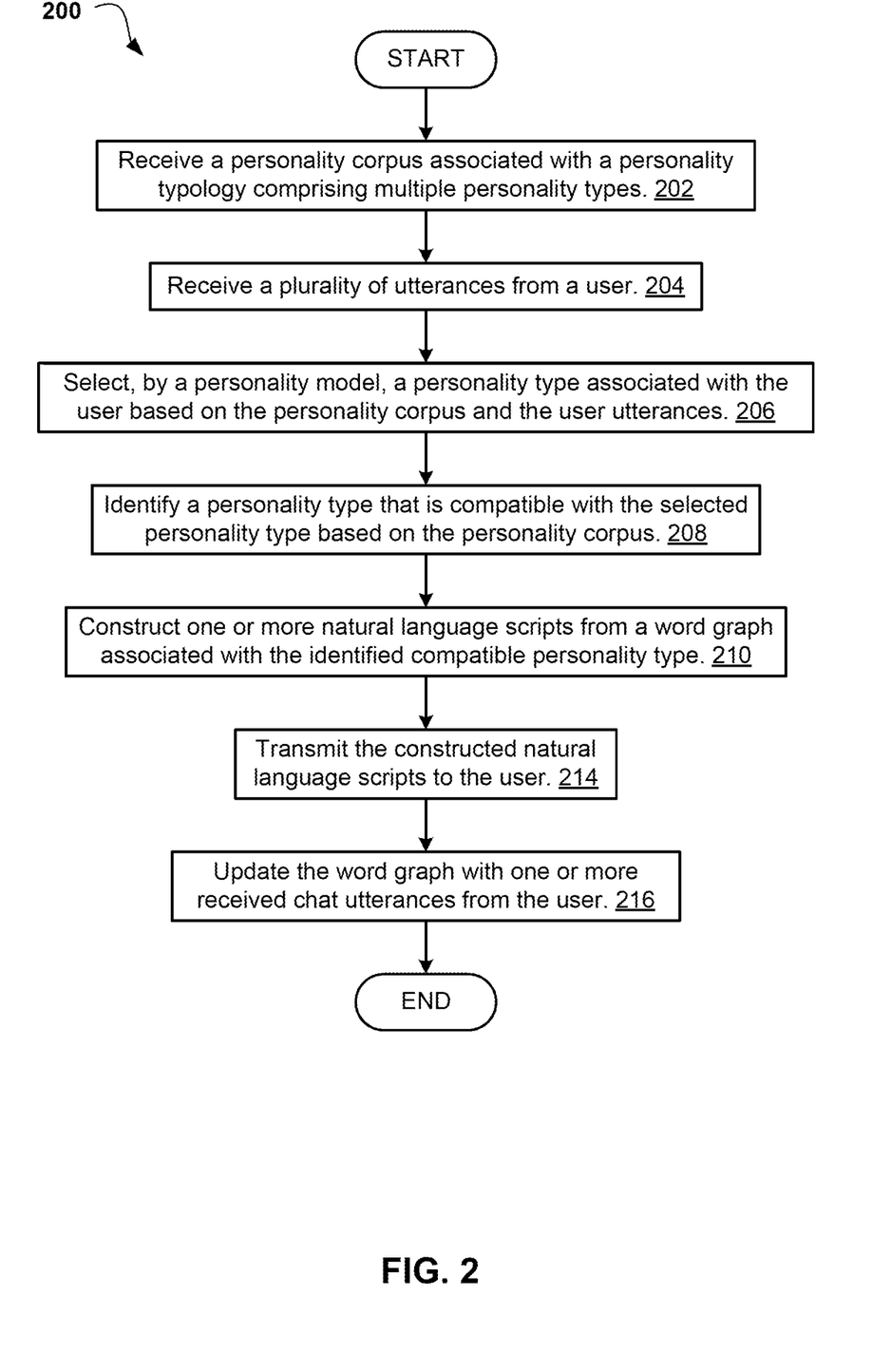
FIG. 2 is an operational flowchart illustrating a personality enhancement process according to at least one embodiment.

Referring now to FIG. 2, an operational flowchart illustrating a personality enhancement process 200 is depicted according to at least one embodiment. At 202, the personality enhancement program 108 may receive a personality corpus associated with a personality typology comprising multiple personality types. The personality corpus may comprise a digital repository storing information defining a personality typology, wherein a personality typology may comprise a method of distinguishing individuals by their behavioral traits and viewing individuals as defined types based on those behavioral traits. While examples herein may be described in reference to the Myers-Briggs Type Indicator for purposes of simplicity, other personality typologies may be used, such as the Keirsey Temperament Sorter, Brain Dominance, Socionics, The Big Five personality traits, et cetera. The personality corpus may comprise the personality typology it is defining, the categories, or personality types, comprising that personality typology, and a methodology of how to identify a user as belonging to the personality types from natural language associated with the user. The methodology may identify linguistic components of natural language, namely words, phrases, bigrams, trigrams, word collocations, topics, et cetera, which may be associated with one or more personality types or which may be associated with concepts, ideas, emotions, traits, et cetera which are in turn associated with one or more personality types. For example, where a certain personality type is passionate, words and phrases associated with passion may be associated with that personality type. In embodiments, the personality corpus may comprise a word graph associated with each personality type, where the word graph represents all of the linguistic data and personality information associated particularly with a given personality type.

A personality corpus for the Myers-Briggs Type Indicator may be implemented as follows, according to at least one embodiment; a data file comprising sixteen separate lists, wherein the lists are each associated with one of the sixteen separate personality types: STJ, ISFJ, INFJ, INTJ, ISTP, ISFP, INFP, INTP, ESTP, ESFP, ENFP, ENTP, ESTJ, ESFJ, ENFJ, and ENTJ. Each list comprises a number of tags associated with that personality type; tags may be metadata assigned to linguistic components of natural language, including words, phrases, bigrams, trigrams, word collocations, topics, et cetera, which may be associated with the personality type or which may be associated with concepts, ideas, emotions, traits, et cetera which are in turn associated with the personality type. For example, the list for ENFP may comprise tags such as empathetic, emotional, enthusiastic, confident, et cetera. A given tag may appear in multiple different lists, to the extent that that tag can be indicative of more than one personality type. To determine if a given word or other component of linguistics data falls into a given personality type, the personality enhancement program 108 may consult metadata associated with that linguistics data to determine associated tags, or emotive descriptors, and look up the tags in the personality corpus. The metadata may be found in, for example, a separate text corpus comprising a list of pre-processed linguistics data with tags pre-provided.

The personality corpus may further identify one or more personality types that are compatible with a given personality type; a compatible personality type may be more likely to offer a good match or synergy with the given personality type in terms of communication styles, values, preferences, and approaches to various aspects of life. In other words, compatibility represents an increased likelihood of individuals with compatible personality types getting along well, understanding each other, and having harmonious interactions. Compatible personality types may be explicitly listed in the personality corpus, and/or may be inferred or modified from user feedback regarding past interactions between users of particular personality types and chatbots embodying different personality types within a given personality typology.

At 204, the personality enhancement program 108 may receive a plurality of utterances from a user. User utterances may either be in textual form as transmitted to personality enhancement program 108 or dialogue system 107 from an end user device 103 such as a cell phone, laptop, tablet, et cetera, or as audible speech received by a user interface device set 123, for example at a microphone integrated into a mobile phone, standalone virtual assistant device, headset, et cetera. A user utterance may represent a unit of natural language ranging in granularity anywhere from individual phonemes to words to entire sentences, and anything in between. In embodiments, the personality enhancement program 108 may store all chat utterances of a user in a single user corpus associated with that user that grows over time as the user interacts with the dialogue system 107.

At 206, the personality enhancement program 108 may select, using a personality model, a personality type associated with the user based on the personality corpus and the user utterances. The personality model may be a machine learning model which receives the user utterances and personality corpus as input, and outputs a personality model associated with the user. The personality model may parse and analyze the user utterances to extract items of linguistics data such as words, syntax, term frequencies, collocations and colligations of words, tone of voice, speaking rate, volume, et cetera. The personality model may utilize audio processing techniques to analyze chat utterances comprising audible speech and convert audible speech into text and may use natural language text processing techniques to parse natural language text and extract the linguistics data from the chat utterances. The personality model may perform a number of different analyses on the linguistics data to infer personality information from the chat utterances, wherein personality information may comprise information that may be used to classify elements of the linguistics data according to the personality type with which it may be most aligned. For any given personality type, there may be certain words and phrases that are appealing; for instance, under the Myers-Briggs personality typology, a person of type ISTJ, which is a personality type associated with introversion, sensing, thinking, and judging, might favor more technical or in-depth words and phrases and sentence structures, whereas a person of type ENFP, which is a personality type associated with extroversion, intuition, feeling, and perceiving, may use more emotional and descriptive words, and/or a louder tone. In embodiments, the personality model may employ emotion classification to infer an emotion such as happiness, anger, sadness, jealousy et cetera associated with a given item of linguistics data; tone classification to infer a tone such as formal, optimistic, grave, et cetera associated with a given item of linguistics data; sentiment classification, which may include inferring a sentiment such as positive or negative associated with a given item of linguistics data, et cetera. The personality model may perform topic modelling on the linguistics data to infer a topic associated with the chat utterances; topic modelling may be used to identify the most probabilistically important words to appear in the user utterances, and extract a list of key terms within the user utterances that may be used to determine how such words are aligned to the personality types. The personality model may perform any analyses that may yield information that could be used to infer personality types based on the personality typology being used; for example, a personality model employing the Myers-Briggs personality typology may analyze a rarity of words comprising the user utterance, as the presence of many or particularly unusual words may indicate creativity or quirkiness, which may in turn indicate an INTJ (Introverted, Intuitive, Thinking, and Judging) personality type.

Based on the analyses, the personality model may sort the items of linguistics data based on the personality types to which they best align. The personality model will compare the personality information associated with each item of linguistics data against the personality corpora to sort the items of linguistics data comprising the user utterances according to the personality types with which they are associated. For example, the personality model may create a database, with a column for each personality type, and may sort the items of linguistic data into the columns of the personality types to which they belong. If an item of linguistics data falls under multiple personality types, then the personality model may classify the same item of linguistics data as aligning with multiple personality types, and/or may identify a single personality type which that item of linguistics data is most strongly associated with, for example by assigning to the item of linguistics data a score between 0 and 1 for each personality type where the score represents how closely the item of linguistics data is aligned with that personality type, with a score of one indicating perfect alignment and a score of zero indicating no alignment; the personality model may then classify the item of linguistics data as aligning with the highest-scoring personality type. In an exemplary embodiment, the personality model may perform emotion classification using the five core emotion types comprising the Myers-Briggs personality typology: happiness, fear, sadness, disgust, and anger. The personality model may assign an emotive score to items of the linguistics data based on the emotion classification, wherein the emotive score enumerates the emotions most strongly associated with the items of linguistics data; the personality model may then sort the items of linguistic data into categories corresponding with the sixteen Myers-Briggs personality types based on the emotive score and the primary emotions associated with those personality types.

The personality model may assign a score between zero and one to each personality type, where the score represents how closely the items of linguistics data are collectively aligned with a given personality, with one being the highest level of alignment and zero the lowest. Put another way, the score represents the level of agreement between the user discourse represented by the user utterances, and the discourse associated with a given personality type. The personality model may select a personality type from the plurality of personality types with the highest associated score. Here, the personality model may identify the highest score, or the score that is closest to 1, and may identify the personality type from the personality corpus which is associated with that score. If two or more are equal, the personality model may select randomly, or may select both.

In embodiments, the personality enhancement program 108 may need a minimum amount of user utterances to identify a personality type associated with the user and may not perform the step of selecting a personality associated with the user until a threshold number of user utterances have been received by personality enhancement program 108. In embodiments, the personality enhancement program 108 may, for example, update the user's personality once per conversation, throughout the conversation at regular intervals, in real time, and/or as utterances are received. User utterances and the results of various analyses applied to them by the personality model, as well as any past personality determinations, may be saved as data in a profile associated with the user. Past user utterances, as received by personality enhancement program 108 or imported from other systems, services, corpora, et cetera, may be added to the user profile, and/or to word graphs associated with personalities. The personality enhancement program 108 may take into account a user's saved utterances from past conversations or interactions in performing a personality determination.

In embodiments, the personality enhancement program 108 may comprise a number of specialized personality models that are each associated with a different personality typology, and which are trained on training data comprising linguistic data labeled with emotive descriptors and other such metadata that is drawn from that personality typology; the personality enhancement program 108 may select a personality model based on the personality typology identified in the personality corpus. In embodiments, the personality enhancement program 108 may employ a single general personality model, which is trained on a labeled training data corpus comprising items of linguistic data that are labeled with emotive descriptors, such as "passionate," "bold," "empathetic," et cetera, which may be used to associate the items of linguistics data with a number of different personality types. In embodiments, personality enhancement program 108 may extract linguistic data and/or personality data from the user utterances separately from the personality model or models and may provide the linguistics data and/or personality data to the personality model as input.

At 208, the personality enhancement program 108 may identify a personality type that is compatible with the selected personality type based on the personality corpus. Here, the personality enhancement program 108 may consult the personality corpus to identify personality types that are compatible with the personality type selected as corresponding to that of the user. Where a personality typology identifies multiple levels of compatibility between different personality types, personality enhancement program 108 may select the compatible personality type with the highest level of compatibility. Where there are multiple equally compatible personality types, the personality enhancement program 108 may select one at random, may select a personality type that the user or generic users of the same personality type have provided the most positive feedback regarding, et cetera.

At 212, the personality enhancement program 108 may generate one or more natural language scripts from a word graph associated with the compatible personality type. The word graph may be a data structure associated with a personality type that captures the relationship between words in a sentence or a piece of text aligned with a personality type, which may represent words as nodes, and the transitions or connections between them as edges. These transitions can capture linguistic properties such as word sequences, grammar, and semantic relationships that may occur in discourse from an individual associated with a given personality type. In embodiments, the personality enhancement program 108 may retrieve a word graph, for example from the personality corpus, an online repository, local storage, et cetera, which is associated with the compatible personality type. In embodiments, the personality enhancement program 108 may initially receive a default word graph, which may initially be the same for all personality types or may initially be specialized for each personality type and may build and modify the word graphs over time.

The personality enhancement program 108 may create a natural language script that is reactive to the meaning of the user's chat utterance, but which comprises words and linguistics data drawn solely from the associated word graph of the compatible personality type. In this way, a response may be tailored to align with a personality type compatible with the personality type of the user. The personality enhancement program 108 may create the script by selecting words and phrases from the word graph and assembling them using linguistics data from the word graph into a response to the user utterances. In embodiments, the personality enhancement program 108 may modify the selection by applying the Cohen's Kappa hypothesis test to the words of the word graph; words or phrases that fail the Cohen's Kappa hypothesis test would not be included within a list of candidate terms for a given script for a specific personality type. Alternatively, the personality enhancement program 108 may modify the selection by alternatively mapping each word from the word graph in the form of a word2vec with cartesian coordinate mapping, and may then determine the cosine similarity between the words of the word graph associated with the compatible personality type and the words uttered by the user; if the distance between each word is, for example, a number of standard deviations distance from the mean value, the personality model may reject the words being aligned. Conversely, words that are within a mean distance could be approved for use as part of a script.

In embodiments, the personality enhancement program 108 may use Cohen's Kappa to validate the text derived for natural language scripts. Cohen's Kappa may be used to infer alignment between text corpora by providing a hypothesis test score to determine whether a body of text is aligned to another body of text; the personality enhancement program 108 may calculate a score for the generated natural language script using Cohen's Kappa to enumerate the accordance or discordance between the generated natural language script and the word graph, or sample text associated with the compatible personality type. If the calculated score falls below a threshold, the personality enhancement program 108 may generate a new script until the personality enhancement program 108 generates a script that meets or exceeds the alignment threshold.

In embodiments, the personality enhancement program 108 may generate multiple natural language scripts concurrently, or substantially concurrently, may score the set of scripts using Cohen's Kappa, and may select the highest scoring script for transmission to the user. In embodiments, if none of the natural language scripts exceed the alignment threshold, the personality enhancement program 108 may generate a new set of natural language scripts.

In embodiments, the natural language scripts may be generated by one or more chatbots, which may be software agents, subroutines, or software programs associated with personality enhancement program 108 which are capable of conducting a conversation with a user, and which each comprise or be associated with a word graph and may be associated with a particular personality type. The personality enhancement program 108 may select a chatbot from one or more chatbots associated with a personality type that is compatible with the personality type identified as pertaining to the user, which may in turn generate the natural language script.

At 214, the personality enhancement program 108 may transmit the generated one or more natural language scripts to the user. The personality enhancement program 108 may respond to the chat utterance using the generated natural language script by transmitting the natural language script to an end user device 103 or to dialogue system 107, or through any number or combination of devices from peripheral device set 114 capable of communicating natural language to the user. These devices of peripheral device set 114 may include speakers for communicating audible speech, display devices for communicating written speech or reproducing gestures or sign languages, haptic vibration motors or other vibration devices for generating haptic feedback, or a robotic hand for reproducing gestures or sign languages. Where the natural language script is to be communicated audibly, the personality enhancement program 108 may convert the natural language script into audio using text-to-speech.

In embodiments, the personality enhancement program 108 may transmit the natural language script in the same format as the chat utterance. For example, if the chat utterance comprised audible speech, the personality enhancement program 108 may convert the natural language script to audible speech. If the user utterance comprised sign language, the personality enhancement program 108 may respond in sign language. The personality enhancement program 108 may utilize the output generation functionality of the dialogue system 107 to create the output, and/or may utilize the output rendering functionality to render the created response in the real world and communicate the natural language script to the user.

At 216, the personality enhancement program 108 may update the word graph with one or more received chat utterances from the user, the personality information and/or the linguistics data. The personality enhancement program 108 may, through the personality model, build out the word graph, such that over time the word graph grows and becomes more accurate and robust. In embodiments, the user may rate the conversation, for example in response to personality enhancement program 108 sending the user a graphical or textual prompt; the rating may be used to assess the accuracy of the personality model, and to improve future scoring. In embodiments, personality enhancement program 108 may resample user utterances every day, week, month, et cetera. In embodiments, personality enhancement program 108 may, for example, score the utterances using a net promoter score, or ordinal score between, for example, one and five. In embodiments, the personality enhancement program 108 may prompt users to score the dialogue overall, or to score every distinct utterance that the chatbot provides via the script, thereby providing feedback to the personality model. The personality enhancement program 108 may modify weights of utterances and add, remove, or prioritize chat utterances for a particular personality type over time. In some embodiments, the personality enhancement program 108 may measure the scores against a threshold and remove utterances with values that have a score below the threshold.

Figure 3:
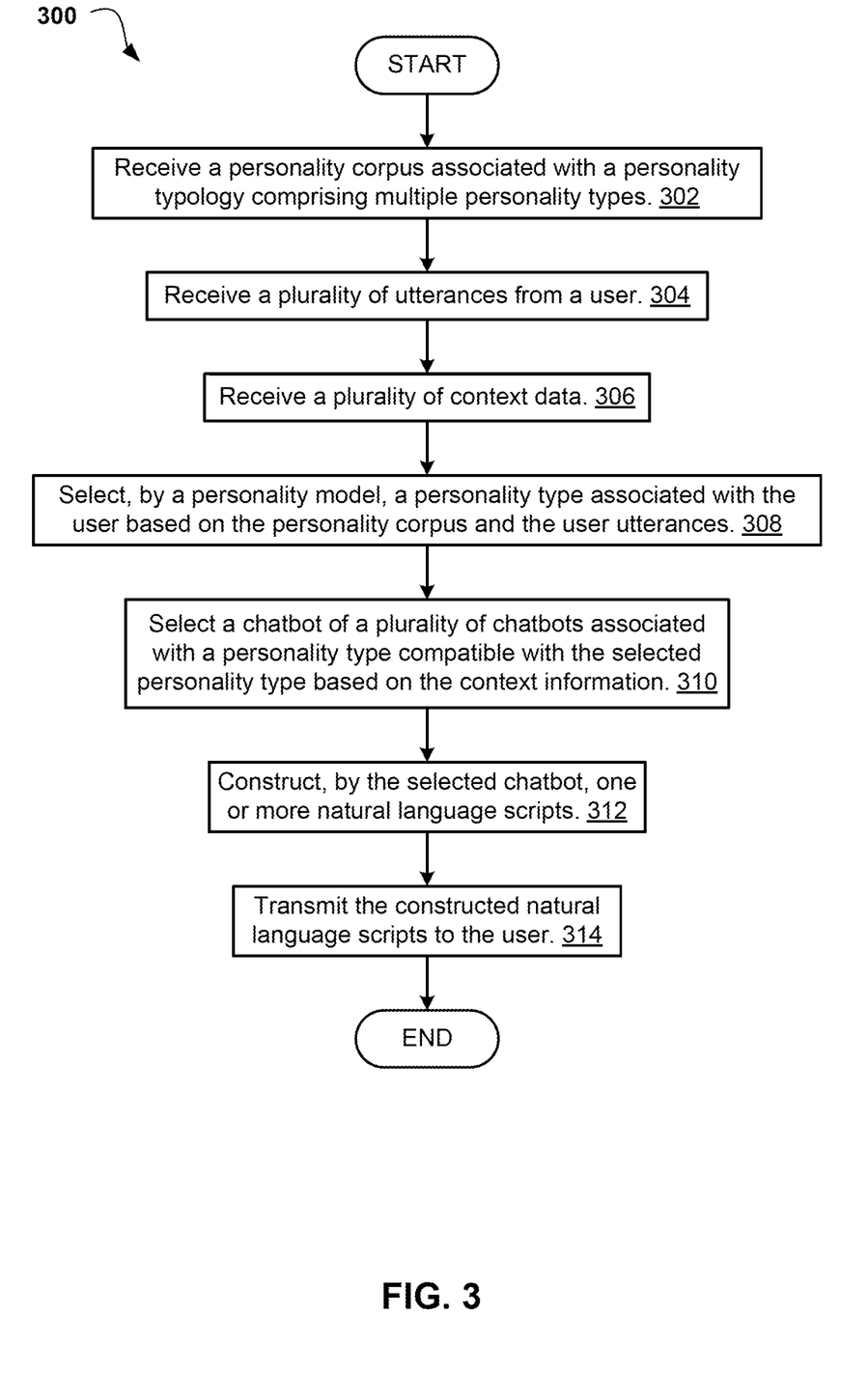
FIG. 3 is an operational flowchart illustrating a personality enhancement process according to at least one embodiment.

Referring now to FIG. 3, an operational flowchart illustrating a personality enhancement process 300 is depicted according to at least one embodiment. At 302, the personality enhancement program 108 may receive a personality corpus associated with a personality typology comprising multiple personality types. The personality corpus may comprise a body of information on a personality typology, wherein a personality typology may comprise a method of distinguishing individuals by their behavioral traits and viewing individuals as defined types based on those behavioral traits. The personality corpus may comprise the personality typology it is defining, the categories, or personality types, comprising that personality typology, and a methodology of how to identify a user as belonging to the personality types from natural language associated with the user. The methodology may identify linguistic components of natural language, namely words, phrases, bigrams, trigrams, word collocations, topics, et cetera, which may be associated with one or more personality types or which may be associated with concepts, ideas, emotions, traits, et cetera which are in turn associated with one or more personality types. In embodiments, the personality corpus may comprise a word graph associated with each personality type, where the word graph represents all of the linguistic data and personality information associated particularly with a given personality type. The personality corpus may further identify one or more personality types that are compatible with a given personality type. Compatible personality types may be explicitly listed in the personality corpus, and/or may be inferred or modified from user feedback regarding past interactions between users of particular personality types and chatbots embodying different personality types within a given personality typology.

At 304, the personality enhancement program 108 may receive a plurality of utterances from a user. User utterances may either be in textual form as transmitted to personality enhancement program 108 or dialogue system 107 from an end user device 103 such as a cell phone, laptop, tablet, et cetera, or as audible speech received by a user interface device set 123, for example at a microphone integrated into a mobile phone, standalone virtual assistant device, headset, et cetera. A user utterance may represent a unit of natural language ranging in granularity anywhere from individual phonemes to words to entire sentences, and anything in between. In embodiments, the personality enhancement program 108 may store all chat utterances of a user in a single user corpus associated with that user that grows over time as the user interacts with the dialogue system 107.

At 306, the personality enhancement program 108 may receive a plurality of context data. The context data may be any data that indicates a domain associated with the user utterances. The domain may comprise an environment or field or context within which a chatbot associated with personality enhancement program 108 is equipped and/or intended to conduct a conversation with a human user; the domain accordingly influences the purpose or goal of the personality determination, and may encompass specialized words or determinations et cetera which, if applied to other domains, might reduce the accuracy and may potentially confuse the model. For example, the domain may be medicine; in such a case, the personality enhancement program 108 may interact with users with the objective of diagnosing problems, connecting the user with medical resources, explaining medical terminology or procedures, et cetera. As such, chatbots associated with the medical domain must comprise word graphs including specialized medical vocabulary or ordinary words that have a particular meaning in a medical context that they might not have in other contexts. For example, the words "condition," "trial" or "culture" may have different meanings in a medical context than in, say, a sporting context. Examples of other domains may include, for example, commercial sales, teaching, phone services, et cetera. In embodiments, the context data may be pre-provided and may explicitly identify a domain associated with personality enhancement program 108. In embodiments, the personality enhancement program 108 may infer the domain from previous or ongoing conversations with the user, and/or may explicitly ask the user for the domain or for information from which the domain may be inferred, for example by asking the purpose of the user's interaction with personality enhancement program 108.

In some embodiments of the invention, the context data may additionally or alternatively comprise user data. In embodiments, user data may include accessibility information that may be relevant to how the user might prefer to interact with the personality enhancement program 108, for example pre-provided user preferences regarding how the user prefers to interact with the chatbot, such as through voice, graphical menus, text, or some combination, medical accessibility factors provided by the user such as impaired sight or hearing, mobile devices associated with the user and supported interface capabilities associated with such mobile devices, et cetera.

At 306, the personality enhancement program 108 may select, using a personality model, a personality type associated with the user based on the personality corpus and the user utterances. The personality model may parse and analyze the user utterances to extract linguistics data such as words, syntax, term frequencies, collocations and colligations of words, tone of voice, speaking rate, volume, et cetera. The personality model may utilize audio processing techniques to analyze chat utterances comprising audible speech and convert audible speech into text and may use natural language text processing techniques to parse natural language text and extract the linguistics data from the chat utterances. The personality model may perform a number of different analyses on the linguistics data to infer personality information from the chat utterances, wherein personality information may comprise information that may be used to classify elements of the linguistics data according to the personality type with which it may be most aligned. In embodiments, the personality model may employ emotion classification to infer an emotion such as happiness, anger, sadness, jealousy et cetera associated with a given item of linguistics data; tone classification to infer a tone such as formal, optimistic, grave, et cetera associated with a given item of linguistics data; sentiment classification, which may include inferring a sentiment such as positive or negative associated with a given item of linguistics data, et cetera. The personality model may perform topic modelling on the linguistics data to infer a topic associated with the chat utterances. The personality model may perform any analyses that may yield information that could be used to infer personality types based on the personality typology being used.

Based on the analyses, the personality model may sort the items of linguistics data based on the personality types to which they best align. The personality model may compare the personality information associated with each item of linguistics data against the personality corpora to sort the items of linguistics data comprising the user utterances according to the personality types with which they are associated. If an item of linguistics data falls under multiple personality types, then the personality model may classify the same item of linguistics data as aligning with multiple personality types, and/or may identify a single personality type which that item of linguistics data is most strongly associated with; the personality model may then classify the item of linguistics data as aligning with the highest-scoring personality type.

The personality model may assign a score to each personality type, where the score represents how closely the items of linguistics data are collectively aligned with a given personality. The personality model may select a personality type from the plurality of personality types with the highest associated score. If two or more are equal, the personality model may select randomly, or may select both.

In embodiments, the personality enhancement program 108 may need a minimum amount of user utterances to identify a personality type associated with the user and may not perform the step of selecting a personality associated with the user until a threshold number of user utterances have been received by personality enhancement program 108. User utterances and the results of various analyses applied to them by the personality model, as well as any past personality determinations, may be saved as data in a profile associated with the user. Past user utterances, as received by personality enhancement program 108 or imported from other systems, services, corpora, et cetera, may be added to the user profile, and/or to word graphs associated with personalities. The personality enhancement program 108 may take into account a user's saved utterances from past conversations or interactions in performing a personality determination.

At 310, the personality enhancement program 108 may select a chatbot of a plurality of chatbots associated with the compatible personality type based on the context information and the personality information. The personality enhancement program 108 may consult the personality corpus to identify personality types that are compatible with the personality type selected as corresponding to that of the user. Where a personality typology identifies multiple levels of compatibility between different personality types, personality enhancement program 108 may select the compatible personality type with the highest level of compatibility. Where there are multiple equally compatible personality types, the personality enhancement program 108 may select one at random, may select a personality type that the user or generic users of the same personality type have provided the most positive feedback regarding, et cetera. In embodiments, the personality enhancement program 108 may comprise a chatbot of each personality type for each of a plurality of domains, such that any given domain has a chatbot for each personality type associated with it. The personality enhancement program 108 may infer a domain from the context data and may select a chatbot that is associated with both a personality type compatible with the identified personality type of the user and associated with the inferred domain. Accordingly, the selected chatbot will comprise a word graph that comprises both domain-specific and personality-specific words, vocabulary, concepts, et cetera, such that the selected chatbot may interact with the user with knowledge of the domain, and in a manner that is compatible with the user's personality type.

In embodiments of the invention, the chatbots may be further differentiated from each other by the means through which the chatbot is capable of interfacing with users. For example, chatbots may further be text-based, menu-based, voice-based, or hybrid. Text-based chatbots may interface with a user purely through text; menu-based chatbots may interface with a user through a menu or buttons, which may be displayed responsive to the user's utterances and/or menu/button selections; voice-based chatbots may interface with a user by converting text scripts to audible speech; and hybrid chatbots may use a combination of the above methods to interface with a user. For each personality type and/or domain, personality enhancement program 108 may comprise multiple chatbots each using a different interface method. Alternatively, each chatbot may be equipped with a number of interface options which may be selected. In embodiments, for example where context data comprises user data, personality enhancement program 108 may select a chatbot that uses an interface method best suited to the user based on the user data. For example, if the user data indicates that a user has impaired hearing, is using a device that lacks speakers, simply prefers text, et cetera, the personality enhancement program 108 may select a text-based chatbot that is associated with a domain and/or personality type that is compatible with that of the user. In another example, where a user has impaired sight, the personality enhancement program 108 may select a chatbot that both displays text or menus and also reads the text or textual content of the menus to the user.

In embodiments, for example where personality enhancement program 108 identifies relationships between interface options preferred by users and personality types associated with those users, the personality enhancement program 108 may select a chatbot with an interface type selected based on the personality type associated with the user; for example, users of personality types associated with shyness, introversion, gentleness, et cetera may statistically prefer chatbots with text-based or menu-based interfaces, whereas users of personality types associated with extroversion, leadership, confidence, et cetera may statistically prefer chatbots with voice-based interfaces. As such, personality enhancement program 108 may choose a chatbot at least in part based on whether the interface option with the chatbot is statistically preferred by other individuals of the same personality type as the user.

At 312, the selected chatbot may generate one or more natural language scripts from a word graph associated with the personality type. Here, the personality enhancement program 108 may retrieve or interface with a word graph in the personality corpus which is associated with the selected personality type. The selected chatbot may then create a natural language script or receive a script from dialogue system 107 or personality enhancement program 108, that is reactive to the meaning of the user's chat utterance, but which comprises words and linguistics data drawn solely from the word graph of the associated chatbot. In this way, a response may be tailored to align with a personality type compatible with the personality type of the user, as well as a domain associated with the user utterance. The chatbot may create the script by selecting words and phrases from the word graph and assembling them using linguistics data from the word graph into a response to the user utterances. In embodiments, the personality enhancement program 108 may modify the selection by applying the Cohen's Kappa hypothesis test to the words of the word graph; words or phrases that fail the Cohen's Kappa hypothesis test would not be included within a list of candidate terms for a given script for a specific personality type. Alternatively, the personality enhancement program 108 may modify the selection by alternatively mapping each word from the word graph in the form of a word2vec with cartesian coordinate mapping, and may then determine the cosine similarity between the words of the word graph associated with the compatible personality type and the words uttered by the user; if the distance between each word is, for example, a number of standard deviations distance from the mean value, the personality model may reject the words being aligned. Conversely, words that are within a mean distance could be approved for use as part of a script.

In embodiments, the personality enhancement program 108 may use Cohen's Kappa to validate the text derived for natural language scripts. Cohen's Kappa may be used to infer alignment between text corpora by providing a hypothesis test score to determine whether a body of text is aligned to another body of text; the personality enhancement program 108 may calculate a score for the generated natural language script using Cohen's Kappa to enumerate the accordance or discordance between the generated natural language script and the word graph, or sample text associated with the compatible personality type. If the calculated score falls below a threshold, the personality enhancement program 108 may generate a new script until the personality enhancement program 108 generates a script that meets or exceeds the alignment threshold.

In embodiments, the chatbot may generate multiple natural language scripts concurrently, or substantially concurrently, may score the set of scripts using Cohen's Kappa, and may select the highest scoring script for transmission to the user. In embodiments, if none of the natural language scripts exceed the alignment threshold, the personality enhancement program 108 may generate a new set of natural language scripts.

At 314, the personality enhancement program 108 may transmit the generated one or more natural language scripts to the user. The personality enhancement program 108 may respond to the chat utterance using the generated natural language script by transmitting the natural language script to an end user device 103 or to dialogue system 107, or through any number or combination of devices from peripheral device set 114 capable of communicating natural language to the user. In embodiments, the personality enhancement program 108 may communicate the natural language to the user using the interface format associated with the selected chatbot. For example, where the chatbot is menu-based, personality enhancement program 108 may generate menus and other graphical user interface elements comprising the natural language script and display the generated graphical user interface elements on a display-equipped end user device 103.

Figure 4:
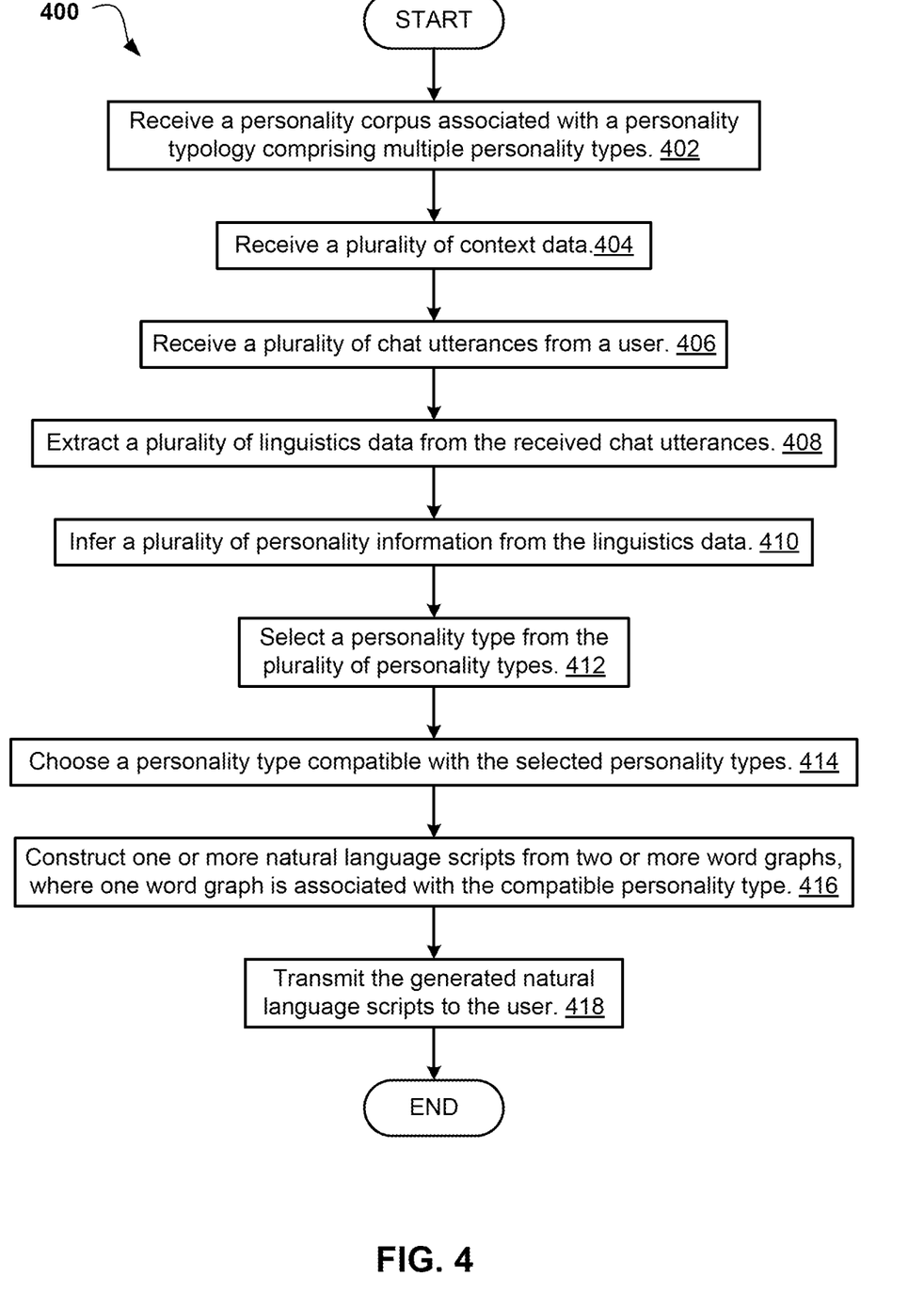
FIG. 4 is an operational flowchart illustrating a personality enhancement process according to at least one embodiment.

Referring now to FIG. 4, an operational flowchart illustrating a personality enhancement process 400 is depicted according to at least one embodiment. At 402, the personality enhancement program 108 may receive a personality corpus associated with a personality typology comprising multiple personality types. The personality corpus may comprise a body of information on a personality typology, wherein a personality typology may comprise a method of distinguishing individuals by their behavioral traits and viewing individuals as defined types based on those behavioral traits.

At 404, the personality enhancement program 108 may receive a plurality of context data. The context data may be any data that indicates a domain associated with the user utterances. In embodiments, the personality enhancement program 108 may infer the domain from previous or ongoing conversations with the user, and/or may explicitly ask the user for the domain or for information from which the domain may be inferred.

At 406, the personality enhancement program 108 may receive a plurality of utterances from a user. User utterances may either be in textual form as transmitted to personality enhancement program 108 or dialogue system 107 from an end user device 103 such as a cell phone, laptop, tablet, et cetera, or as audible speech received by a user interface device set 123, for example at a microphone integrated into a mobile phone, standalone virtual assistant device, headset, et cetera.

At 408, the personality enhancement program 108 may extract a plurality of linguistics data from the received chat utterances. The personality enhancement program 108 may utilize audio processing techniques to analyze chat utterances comprising audible speech and convert audible speech into text, and may use natural language text processing techniques to parse natural language text, and may extract items of linguistics data such as words, syntax, term frequencies, collocations and colligations of words, tone of voice, speaking rate, volume, et cetera from the user utterances. The personality enhancement program 108 may utilize audio processing techniques to analyze chat utterances comprising audible speech and convert audible speech into text and may use natural language text processing techniques to parse natural language text and extract the linguistics data from the chat utterances.

At 410, the personality enhancement program 108 may infer a plurality of personality information from the linguistics data. The personality enhancement program 108 may perform a number of different analyses on the linguistics data to infer personality information from the chat utterances, wherein personality information may comprise information that may be used to classify elements of the linguistics data according to the personality type with which it may be most aligned. In embodiments, the personality model may employ emotion classification to infer an emotion such as happiness, anger, sadness, jealousy et cetera associated with a given item of linguistics data; tone classification to infer a tone such as formal, optimistic, grave, et cetera associated with a given item of linguistics data; sentiment classification, which may include inferring a sentiment such as positive or negative associated with a given item of linguistics data, et cetera. The personality model may perform topic modelling on the linguistics data to infer a topic associated with the chat utterances; topic modelling may be used to identify the most probabilistically important words to appear in the user utterances, and extract a list of key terms within the user utterances that may be used to determine how such words are aligned to the personality types. The personality model may additionally or alternatively perform any analyses that may yield information that could be used to infer personality types based on the personality typology being used.

At 412, the personality enhancement program 108 may select a personality type from the plurality of personality types. Here, a personality model may assign a score for each of a plurality of personality types based on the personality information. The personality model may compare the personality information against each personality type in the personality corpus and may assign a score between zero and one to each personality type, The personality model may calculate the score using Cohen's Kappa to enumerate the accordance or discordance between the personality information and any given personality type. The personality enhancement program 108 may identify the highest score and may identify the personality type from the personality corpus which are associated with the selected score. In embodiments, the personality enhancement program 108 may use Cohen's Kappa to filter out only the personalities that are aligned to the user utterances.

At 414, the personality enhancement program 108 may choose a personality type compatible with the selected personality type. Here, the personality enhancement program 108 may consult the personality corpus to identify personality types that are compatible with the personality type selected as corresponding to that of the user. Where there are multiple equally compatible personality types, the personality enhancement program 108 choose a compatible personality type from the compatible personality types that has the best user rating; in embodiments, other users may rate their interactions with personality types, and the personality enhancement program 108 may select the compatible personality type that has been rated highest among other users that share the same personality type as the user. In embodiments, the personality enhancement program 108 may select multiple compatible personality types.

At 416, the personality enhancement program 108 may generate one or more natural language scripts from two or more-word graphs associated with the compatible personality type. The personality enhancement program 108 may also infer a domain from the context data and may select another word graph that is associated with the inferred domain. The personality enhancement program 108 may retrieve or interface with two or more-word graphs, at least one of which is associated with the chosen personality type, and at least one of which is associated with the inferred domain. The personality enhancement program 108 may combine the word graphs and apply the Cohen's Kappa hypothesis test to the elements comprising the combined word graphs; elements that fail the Cohen's Kappa hypothesis test would not be included within a list of candidate terms for a given script for a specific personality type and domain. The personality enhancement program 108 may then create a natural language script from the list of candidate terms and elements that passed the Cohen's Kappa hypothesis test.

In embodiments, the personality enhancement program 108 may use Cohen's Kappa to validate the text derived for natural language scripts. Cohen's Kappa may be used to infer alignment between text corpora by providing a hypothesis test score to determine whether a body of text is aligned to another body of text; the personality enhancement program 108 may calculate a score for the generated natural language script using Cohen's Kappa to enumerate the accordance or discordance between the generated natural language script and the word graph, or sample text associated with the compatible personality type. If the calculated score falls below a threshold, the personality enhancement program 108 may generate a new script until the personality enhancement program 108 generates a script that meets or exceeds the alignment threshold.

At 418, the personality enhancement program 108 may transmit the generated one or more natural language scripts to the user. The personality enhancement program 108 may respond to the chat utterance using the generated natural language script by transmitting the natural language script to an end user device 103 or to dialogue system 107, or through any number or combination of devices from peripheral device set 114 capable of communicating natural language to the user.

It may be appreciated that FIGS. 2-4 provide only illustrations of individual implementations and do not imply any limitations with regard to how different embodiments may be implemented.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for human-machine interfacing, the method comprising:

receiving, by a processor, a personality corpus associated with a personality typology comprising multiple personality types;
extracting, by a processor, a plurality of utterances from a user;
selecting, by a personality model, a personality type associated with the user based on the utterances and the personality corpus;
identifying, by a processor, a compatible personality type of the selected personality type;
constructing, by a processor, one or more natural language scripts from a word graph associated with the compatible personality type; and
transmitting, by a processor, the one or more natural language scripts to the user.

2. The method of claim 1, wherein the personality model is selected from a plurality of specialized personality models based on the personality typology.

3. The method of claim 1, wherein the generated natural language script exceeds an alignment threshold according to a Cohen's Kappa hypothesis test.

4. The method of claim 1, further comprising: updating the word graph with the plurality of chat utterances, the linguistic data, and/or the personality information.

5. The method of claim 1, wherein the selecting comprises scoring a plurality of items of linguistics data based on an alignment with a personality type of the multiple personality types.

6. The method of claim 5, wherein the selecting further comprises selecting a personality type based on the collective scoring of the plurality of items of linguistics data.

7. The method of claim 1, wherein the identified compatible personality type has a highest compatibility level of a plurality of compatible personality types of the selected personality type.

8. A computer system for human-machine interfacing, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a personality corpus associated with a personality typology comprising multiple personality types;
extracting a plurality of utterances from a user;
selecting, by a personality model, a personality type associated with the user based on the utterances and the personality corpus;
identifying a compatible personality type of the selected personality type;
constructing one or more natural language scripts from a word graph associated with the compatible personality type; and
transmitting the one or more natural language scripts to the user.

9. The computer system of claim 8, wherein the personality model is selected from a plurality of specialized personality models based on the personality typology.

10. The computer system of claim 8, wherein the generated natural language script exceeds an alignment threshold according to a Cohen's Kappa hypothesis test.

11. The computer system of claim 8, further comprising: updating the word graph with the plurality of chat utterances, the linguistic data, and/or the personality information.

12. The computer system of claim 8, wherein the selecting comprises scoring a plurality of items of linguistics data based on an alignment with a personality type of the multiple personality types.

13. The computer system of claim 12, wherein the selecting further comprises selecting a personality type based on the collective scoring of the plurality of items of linguistics data.

14. The computer system of claim 8, wherein the identified compatible personality type has a highest compatibility level of a plurality of compatible personality types of the selected personality type.

15. A computer program product for human-machine interfacing, the computer program product comprising:
   one or more computer-readable tangible storage medium and program instructions stored on at least one of the one or more tangible storage medium, the program instructions executable by a processor to cause the processor to perform a method comprising:
      receiving a personality corpus associated with a personality typology comprising multiple personality types;
      extracting a plurality of utterances from a user;
      selecting, by a personality model, a personality type associated with the user based on the utterances and the personality corpus;
      identifying a compatible personality type of the selected personality type;
      constructing one or more natural language scripts from a word graph associated with the compatible personality type; and
      transmitting the one or more natural language scripts to the user.

16. The computer program product of claim 15, wherein the personality model is selected from a plurality of specialized personality models based on the personality typology.

17. The computer program product of claim 15, wherein the generated natural language script exceeds an alignment threshold according to a Cohen's Kappa hypothesis test.

18. The computer program product of claim 15, further comprising: updating the word graph with the plurality of chat utterances, the linguistic data, and/or the personality information.

19. The computer program product of claim 15, wherein the selecting comprises scoring a plurality of items of linguistics data based on an alignment with a personality type of the multiple personality types.

20. The computer program product of claim 19, wherein the selecting further comprises selecting a personality type based on the collective scoring of the plurality of items of linguistics data.

21. A processor-implemented method for human-machine interfacing, the method comprising:
   receiving a personality corpus associated with a personality typology comprising multiple personality types;
   receiving a plurality of utterances from a user;
   receiving a plurality of context information;
   selecting a personality type associated with the user based on the personality corpus and the utterances;
   selecting a chatbot of a plurality of chatbots associated with a personality type compatible with the selected personality type based on the context information;
   constructing, by the selected chatbot, one or more natural language scripts; and
   transmitting the one or more natural language scripts to the user.

22. The method of claim 21, wherein the plurality of chatbots are associated with both a personality type of the multiple personality types and a domain inferred from the context information.

23. The method of claim 21, wherein the selecting is further based on an interface method associated with the chatbot of the plurality of chatbots.

24. The method of claim 23, wherein the one or more natural language scripts consist of a plurality of elements comprising the plurality of word graphs that passed a Cohen's Kappa hypothesis test.

25. A processor-implemented method for human-machine interfacing, the method comprising:
   receiving a personality corpus;
   receiving a plurality of context data;
   receiving a plurality of chat utterances from a user;
   extracting a plurality of linguistics data from the plurality of chat utterances;
   inferring a plurality of personality information from the linguistics data;
   selecting a personality type associated with the user;
   choosing one or more compatible personality type to the selected personality type;
   constructing one or more natural language scripts from a word graph associated with at least the chosen personality type and a word graph associated with a domain inferred from the context data; and
   transmitting the one or more natural language scripts to the user.

* * * * *